US010400894B2

(12) United States Patent
Huber et al.

(10) Patent No.: US 10,400,894 B2
(45) Date of Patent: Sep. 3, 2019

(54) VEHICLE TRANSMISSION, METHOD, AND SENSOR DEVICE FOR DETECTING A SHIFTING POSITION OF A VEHICLE TRANSMISSION

(71) Applicant: KNORR-BREMSE Systeme fuer Nutzfahrzeuge GmbH, Munich (DE)

(72) Inventors: Christian Huber, Munich (DE); Simon Winter, Munich (DE); Martin Rotter, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 742 days.

(21) Appl. No.: 14/825,309

(22) Filed: Aug. 13, 2015

(65) Prior Publication Data
US 2015/0345637 A1 Dec. 3, 2015

Related U.S. Application Data

(63) Continuation of application No. PCT/EP2014/052600, filed on Feb. 11, 2014.

(30) Foreign Application Priority Data

Feb. 14, 2013 (DE) .................. 10 2013 101 503

(51) Int. Cl.
*F16H 63/42* (2006.01)
*G01D 5/20* (2006.01)
(Continued)

(52) U.S. Cl.
CPC ............ *F16H 63/42* (2013.01); *F16H 59/70* (2013.01); *G01D 5/2006* (2013.01); *F16H 2063/3079* (2013.01); *Y10T 74/20177* (2015.01)

(58) Field of Classification Search
CPC combination set(s) only.
See application file for complete search history.

(56) References Cited

U.S. PATENT DOCUMENTS 5,038,627 A * 8/1991 Schwaiger ............ F16H 61/702
477/121
5,743,143 A * 4/1998 Carpenter .............. F16H 59/70
324/207.16
(Continued)

FOREIGN PATENT DOCUMENTS

CN 1177068 A 3/1998
CN 101451611 A 6/2009
(Continued)

OTHER PUBLICATIONS

International Preliminary Report on Patentability (PCT/IB/326 & PCT/IB/373) issued in PCT Application PCT/EP2014/052600, including Written Opinion (PCT/ISA/237) dated Aug. 27, 2015 with English-language translation (twenty-two (22) pages).
(Continued)

*Primary Examiner* — Zakaria Elahmadi
(74) *Attorney, Agent, or Firm* — Crowell & Moring LLP

(57) ABSTRACT

A sensor device is provided for detecting a shifting position of a vehicle transmission. The vehicle transmission includes a transmission chamber, in which transmission elements are arranged. The sensor device includes a bar element, which extends from the transmission chamber into a secondary chamber sealed off from the transmission chamber and is arranged such that the bar element can be moved in dependence on the shifting position. The bar element has an interface arranged in the transmission chamber for coupling the bar element to a transmission element positioned in dependence on the shifting position and an accommodating segment arranged in the secondary chamber. The sensor device also has a transducer element, which is attached to (Continued)

the accommodating segment of the bar element. The sensor device also has a detecting device for detecting a position of the transducer element depending on the shifting position or a motion of the transducer element depending on a change in the shifting position.

8 Claims, 1 Drawing Sheet

(51) Int. Cl.
*F16H 59/70* (2006.01)
*F16H 63/30* (2006.01)

(56) References Cited

U.S. PATENT DOCUMENTS

| | | | |
|---|---|---|---|
| 6,021,368 A * | 2/2000 | Taniguchi | F16H 59/105 318/159 |
| 2006/0011008 A1 | 1/2006 | Hara et al. | |
| 2007/0028709 A1 * | 2/2007 | Futamura | F16H 59/70 74/335 |
| 2008/0058158 A1 * | 3/2008 | Kobayashi | F16H 59/105 477/134 |
| 2009/0288513 A1 * | 11/2009 | Meixner | F16H 59/70 74/336 R |
| 2013/0333517 A1 * | 12/2013 | Osuka | B60K 6/48 74/661 |

FOREIGN PATENT DOCUMENTS

| | | |
|---|---|---|
| CN | 101473150 A | 7/2009 |
| CN | 201539552 U | 8/2010 |
| CN | 102758912 A | 10/2012 |
| DE | 38 36 145 A1 | 4/1990 |
| DE | 42 33 983 A1 | 4/1994 |
| DE | 10 2006 028 785 B3 | 4/2007 |
| DE | 60 2005 005 564 T2 | 4/2009 |
| DE | 10 2009 032 558 A1 | 1/2011 |
| EP | 0 831 253 A2 | 3/1998 |
| EP | 1 617 109 A1 | 1/2006 |
| GB | 2 224 791 A | 5/1990 |
| JP | 61-84445 A | 4/1986 |
| WO | WO 2009/119115 A1 | 10/2009 |

OTHER PUBLICATIONS

Chinese Office Action issued in counterpart Chinese Application No. 201480008822.2 dated Apr. 25, 2016 with English translation (12 pages).
International Search Report (PCT/ISA/210) dated Apr. 17, 2014 with English translation (seven pages).
German Office Action dated Nov. 11, 2013 (seven pages).

* cited by examiner

VEHICLE TRANSMISSION, METHOD, AND SENSOR DEVICE FOR DETECTING A SHIFTING POSITION OF A VEHICLE TRANSMISSION

CROSS REFERENCE TO RELATED APPLICATIONS

This application is a continuation of PCT International Application No. PCT/EP2014/052600, filed Feb. 11, 2014, which claims priority under 35 U.S.C. § 119 from German Patent Application No. 10 2013 101 503.4, filed Feb. 14, 2013, the entire disclosures of which are herein expressly incorporated by reference.

BACKGROUND AND SUMMARY OF THE INVENTION

The present invention relates to a sensor device for detecting a shifting position of a vehicle transmission, to a vehicle transmission and to a method for detecting a shifting position of a vehicle transmission.

Inductive sensors, e.g. moving coils, planar coils and the like are frequently used for detecting a shifting position of a vehicle transmission. Here, in automotive applications in particular, a permanent magnet is normally disposed in a transmission chamber or oil chamber and a sensor element is disposed separately from the oil chamber.

It is an object of the present invention to provide an improved sensor device for detecting a shifting position of a vehicle transmission, an improved vehicle transmission and an improved method for detecting a shifting position of a vehicle transmission.

This object is achieved by a sensor device for detecting a shifting position of a vehicle transmission, a vehicle transmission and a method for detecting a shifting position of a vehicle transmission according to embodiments of the invention.

According to embodiments of the present invention, a transducer element of a sensor for detecting a shifting position of the vehicle transmission can be sealed, separated or encapsulated relative to a transmission chamber containing lubricant, also referred to as an oil chamber. In this case, the transducer element is, in particular, disposed on a component that is designed for transferring a displacement of a transmission element that is dependent on a change in the shifting position to the transducer element.

As a result of the separation or encapsulation of the transducer element relative to the actual transmission chamber of the vehicle transmission, a risk of fouling of the transducer element, for example by swarf from transmission elements in the transmission chamber or oil chamber, can be avoided or excluded. In particular, fouling of the transducer element by ferritic particles of transmission elements in the transmission chamber or oil chamber can be prevented. As a result, the detection accuracy as well as the longevity of a sensor device for detecting a shifting position of a vehicle transmission can be improved.

As a result, a sensor or a sensor device with a transducer element, for example in the form of a permanent magnet, can be used for a transmission control module. The transducer element can be disposed in a separate chamber that is sealed off from the transmission chamber. A detection device of the sensor can for example be disposed separately from the transmission chamber. The detection device and the transducer element can be disposed spaced apart from each other. As a result of the arrangement of the transducer element in a separate sealed chamber, it can be reliably prevented that a magnetic transducer element attracts, for example, ferritic particles from the transmission chamber and unintentionally acts as a swarf collector. Consequently, a change of a sensor signal caused by fouling such that a displacement position would be detected incorrectly can be prevented over the lifetime of the sensor device.

A sensor device for detecting a shifting position of a vehicle transmission comprising a transmission chamber in which transmission elements are disposed has the following features:

(a) a bar element extending from the transmission chamber into an adjoining chamber that is sealed off from the transmission chamber and that is disposed so as to be displaceable depending on the shifting position, wherein the bar element comprises an interface disposed in the transmission chamber for coupling the bar element to a transmission element that is positioned depending on the shifting position and that comprises an accommodating segment that is disposed in the adjoining chamber;

(b) a transducer element that is mounted on the accommodating segment of the bar element; and (c) a detection device for detecting a position of the transducer element that is dependent on the shifting position or a displacement of the transducer element that is dependent on a change of the shifting position.

The vehicle transmission can be a manual transmission, a direct shift gearbox, an automated manual transmission (AMT) or an automatic transmission (AT). The vehicle transmission can be provided for a vehicle that can be a motor vehicle, such as for example an automobile or a commercial vehicle, a rail vehicle or a waterborne vessel. The transmission chamber of the vehicle transmission can be at least partly enclosed by a transmission housing. The transmission elements as well as at least one lubricant can be disposed in the transmission chamber. The transmission elements can be transmission shafts, gearwheels, pinions, a selector shaft, a selector fork and the like. The transmission chamber can be fouled by freely moving swarf. The shifting position or a shift state of the vehicle transmission can correspond to an engaged gear or an engaged drive position of the vehicle. The sensor device can be based on a contactless detection principle. The adjoining chamber can be sealed off from the transmission chamber and separated relative to the surroundings of the vehicle transmission or connected thereto by means of an opening. As a result, the adjoining chamber can be kept free of the swarf present in the transmission chamber. The bar element can be a rod, piston rod or similar. The bar element can be made of a non-magnetic material. The interface can be disposed on a first end of the bar element and the accommodating segment can be disposed on a second end of the bar element. The interface of the bar element remains in the transmission chamber during a displacement of the bar that is dependent on the shifting position. The accommodating segment of the bar element remains in the adjoining chamber during a displacement of the bar element that is dependent on the shifting position. The interface can comprise an attachment segment for attaching a connecting element to the transmission element that is positioned depending on the shifting position. The accommodating segment can be designed to accommodate the transducer element. By disposing the transducer element within the adjoining chamber, the transducer element is protected against fouling by the swarf present in the transmission chamber, which could be attracted by the transducer element. The detection device can be disposed outside the transmission chamber of the vehicle transmission.

At least one sealing element can also be provided for fluid-tight and/or particle-tight sealing of the adjoining chamber off from the transmission chamber. In this case the bar element can be fed through the at least one sealing element. In particular, the at least one sealing element can be designed to seal an opening of the adjoining chamber to the transmission chamber, for example against swarf. The at least one sealing element can comprise a sealing sleeve, a sealing ring or similar. The at least one sealing element can be designed to enable a displacement of the bar element that is dependent on a change of the shifting position, wherein a sealing effect of the at least one sealing element is maintained. Such an embodiment gives the advantage that the adjoining chamber can be reliably sealed off from the transmission chamber while preserving mobility of the bar element.

Furthermore, at least one guide element can be provided, which is disposed in the adjoining chamber at least partly around the bar element. The at least one guide element can be designed to guide the bar element in the adjoining chamber along an axis of motion of the bar element during a displacement of the bar element that is dependent on a change of the shifting position. The at least one guide element can be in the form of or act as a slide bearing. Such an embodiment gives the advantage that tilting of the bar element with the transducer element or measurement element relative to the axis of motion can be prevented because of the at least one guide element. In other words, the distance of the axis of motion from the detection device can be essentially held constant, so that a change of a sensor signal caused by such tilting or a change of distance can be prevented.

In this case the detection device can be designed to detect a direction of motion of the transducer element along an axis of motion of the bar element that is dependent on a change of the shifting position during a displacement of the transducer element mounted on the bar element that is dependent on a change of the shifting position. Such an embodiment gives the advantage that compensation of manufacturing and/or assembly tolerances can be achieved during the exclusive measurement of a direction of motion.

According to one embodiment, the detection device can comprise a sensor based on a magnetic principle and the transducer element can comprise a magnet or a magnetisable material. In this case the detection device or the sensor device can comprise a magnetic field sensor, a Hall sensor or similar. The transducer element can, for example, be implemented as a permanent magnet or as a unit to be magnetized. Such an embodiment gives the advantage that a position and/or displacement of the transducer element can be determined contactlessly for shifting position detection, even if, for example, the detecting device is disposed so as to be separated from the transducer element by an air gap, a housing wall or similar.

In particular, the bar element can be made of aluminum or plastic. The bar element can comprise a non-magnetic material. Such an embodiment gives the advantage that a position determination or displacement determination of the transducer element by the detection device is not interfered with or adversely affected.

A vehicle transmission comprising a transmission chamber in which transmission elements are disposed also has the following features:

(a) a selector fork that is disposed in the transmission chamber and that is designed to shift at least one transmission element;

(b) a selector shaft that is disposed in the transmission chamber and that is designed to displace the selector fork depending on a shifting position of the vehicle transmission; and (c) a version of the aforementioned sensor device for detecting a shifting position of the vehicle transmission, wherein the interface of the bar element of the sensor device is mechanically coupled to the selector fork by means of at least one connecting element.

The selector fork can represent the transmission element of the vehicle transmission that is positioned depending on the shifting position. The selector shaft can be displaced translationally depending on the shifting position. The selector shaft can be designed to displace the selector fork along an axis of the selector shaft depending on the shifting position. A translational displacement of the selector fork that is dependent on the shifting position can be transferred into a translational displacement of the bar element by means of the at least one connecting element. A shifting position or a shift state of the vehicle transmission can be advantageously detected by way of a version of the aforementioned sensor device.

In this case the at least one connecting element can be designed to transfer a displacement that is dependent on a change of the shifting position of the selector fork to the bar element of the sensor device. By use of the at least one connecting element, a translational displacement that is dependent on the shifting position of the selector fork can be transferred into a translational displacement of the bar element. Such an embodiment gives the advantage that the shifting position can be reliably detected by the sensor device.

According to one embodiment, the at least one connecting element can comprise a connecting rod, whose first end is mechanically coupled to the interface of the bar element and whose second end comprises a ball segment or is connected to or a ball element. Here, the ball segment or the ball element can be designed to be mechanically connected to the selector fork. In this case the ball segment or the ball element can be displaceably connected to the selector fork. Such an embodiment gives the advantage that compensation of tolerances and measurement of a direction of motion that is dependent on a change of the shifting state are enabled by a position transfer by way of guide elements of the sensor device as well as the at least one connecting element with a ball segment or a ball element.

A method for detecting a shifting position of a vehicle transmission, wherein the vehicle transmission comprises a transmission chamber in which transmission elements are disposed, comprises the following acts:

(a) transferring a displacement that is dependent on a change of the shifting position of a transmission element that is positioned depending on the shifting position and that is disposed in the transmission chamber to a bar element, wherein the bar element extends from the transmission chamber into an adjoining chamber that is sealed off from the transmission chamber and the bar element is displaceable depending on the shifting position, wherein the bar element comprises an interface that is disposed in the transmission chamber for coupling the bar element to the transmission element that is positioned depending on the shifting position and an accommodating segment that is disposed in the adjoining chamber; and (b) determining a position of a transducer element that is dependent on the shifting position or a displacement of a transducer element that is dependent on a change of the shifting position by way of a detection device in order to detect the shifting position of the vehicle transmission, wherein the transducer element is mounted on the accommodating segment of the bar element.

The method can advantageously be implemented in combination with or using a version of the aforementioned sensor device. As a result of implementing the method, a shifting position of a vehicle transmission can advantageously be detected by way of a version of the aforementioned sensor device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
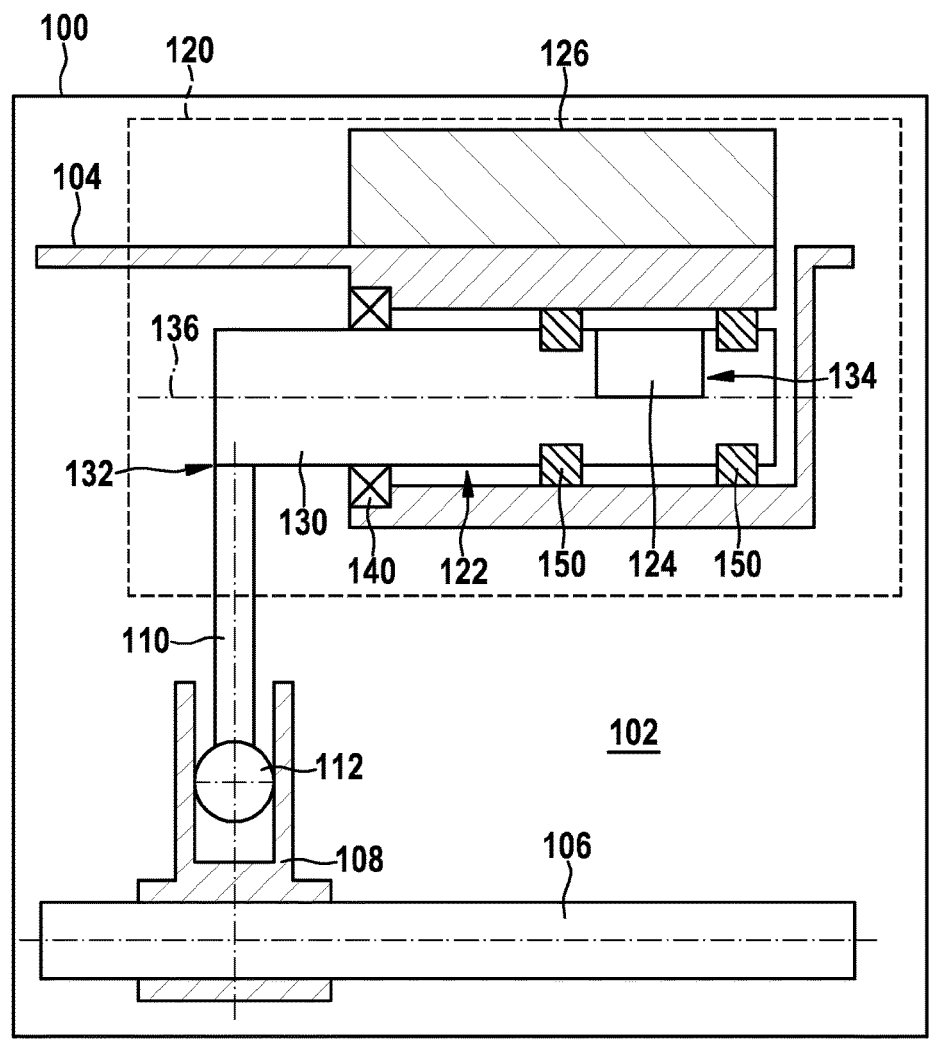
FIG. 1 is a schematic representation of a vehicle transmission with a sensor device according to an exemplary embodiment of the present invention.

In the following description of the preferred exemplary embodiments of the present invention, identical or similar reference characters are used for the elements illustrated in the different figures that have a similar action, wherein a repeated description of said elements is omitted.

FIG. 1 shows a representation of a vehicle transmission with a sensor device according to an exemplary embodiment of the present invention. A vehicle transmission 100, a transmission chamber 102, a transmission housing 104, a selector shaft 106, for example a selector fork 108, a connecting element 110 or a connecting rod, a ball element 112, a sensor device 120, an adjoining chamber 122, a transducer element 124, for example in the form of a permanent magnet, a detecting device 126 or a sensor or sensor element, a bar element 130, an interface 132, an accommodating segment 134, an axis of motion 136, a sealing element 140 and, by way of example, two guide elements 150 are shown. An outer region of the vehicle transmission 100 is located outside the transmission chamber 102 and the adjoining chamber 122.

The vehicle transmission 100 includes the transmission chamber 102, which is separated from the outer region by way of the transmission housing 104. The selector shaft 106 and the selector fork 108 are disposed in the transmission chamber 102 within the transmission housing 104. The selector fork 108 is displaceably mounted on the selector shaft 106. The selector shaft 106 is designed to guide the selector fork 108. The selector shaft 106 is implemented so as to be translationally displaceable. The selector shaft 106 is accordingly displaced translationally depending on a selected shifting position of the vehicle transmission 100.

According to an alternative exemplary embodiment, the selector shaft 106 can be rotatable and the transducer element 124 can be disposed accordingly. The selector shaft 106 is designed to transfer a displacement that is dependent on the shifting position to the selector fork 108 in the form of a translational displacement of the selector fork. The selector fork 108 is designed to be displaced in a translational displacement along an axis of the selector shaft 106 by a displacement of the selector shaft 106 that is dependent on the shifting position. Even though it is not shown in FIG. 1, the vehicle transmission 100 has further transmission elements. The selector fork 108 can be brought into mechanical contact with at least one further transmission element or released from mechanical contact with at least one further transmission element depending on a shifting position of the vehicle transmission 100.

Furthermore, the vehicle transmission 100 includes the sensor device 120. The sensor device 120 is designed for detecting the shifting position of the vehicle transmission 100. The sensor device 120 includes the adjoining chamber 122, the transducer element 124, the detection device 126, the bar element 130, the interface 132, the accommodating segment 134, the sealing element 140 and the guide elements 150.

The bar element 130 extends from the transmission chamber 102 into the adjoining chamber 122. In this case, a first end of the bar element 130 is disposed in the transmission chamber 102 and a second end of the bar element 130 is disposed in the adjoining chamber 122. The bar element 130 includes the interface 132 and the accommodating segment 134.

Furthermore, the axis of motion 136 of the bar element 130 is shown. The axis of motion 136 of the bar element 130 extends along a longitudinal axis of extension of the bar element 130. The bar element 130 is designed to move along the axis of motion 136 depending on a change of the shifting position or depending on a displacement of the selector fork 108.

The interface 132 of the bar element 130 is disposed on the first end of the bar element 130 that is disposed in the transmission chamber 102. The bar element 130 is connected to the selector fork 108 at the interface 132 by use of the connecting element 110 and the ball element 112. In this case, the connecting element 110 is attached to the interface 132 of the bar element 130. The connecting element 110 is connected to the selector fork 108 by way of the ball element 112 so as to be pivotable about an axis relative to the selector fork 108. The connecting element 110 and the ball element 112 are designed to transfer the displacement of the selector fork 108 that is dependent on the shifting position to the bar element 130.

The adjoining chamber 122 is sealed off from the transmission chamber 102 by way of the sealing element 140. The bar element 130 extends through the sealing element 140 or the bar element 130 is fed through the sealing element 140 here. The sealing element 140 is disposed around the bar element 130 in a region between the interface 132 and the accommodating segment 134. The guide elements 150 are disposed in the adjoining chamber 122. The guide elements 150 are designed to guide the bar element 130 during a displacement along the axis of motion 136 or to hold the bar element on the axis of motion 136. Owing to the sealed adjoining chamber 122, a magnetic encapsulation is achieved for a position controller, in this case a transmission controller.

The accommodating segment 134 of the bar element 130 is disposed on the second end of the bar element 130 that is disposed in the adjoining chamber 122. The transducer element 124 is accommodated in the accommodating segment 134. The transducer element 124 remains within the adjoining chamber 122 during a displacement of the bar element 130 along the axis of motion 136, even though this is not explicitly illustrated in FIG. 1.

The detection device 126 of the sensor device 120 is disposed on an outer surface of the transmission housing 104 by way of example. In this case the detection device 126 is disposed in a surface region of the outer surface of the transmission housing 104 that is adjacent to the adjoining chamber 122. The detection device 126 is designed to determine by means of a magnetic sensor principle a position of the transducer element 124 that is dependent on the shifting position or a displacement of the transducer element 124 that is dependent on a change of the shifting position in order to detect the shifting position of the vehicle transmission 100.

A segment of a transmission control module of the vehicle transmission 100 with the sensor device 120, including a magnetic mounting with a bearing and encapsulation, is illustrated in FIG. 1. A translational displacement of the selector shaft 106 takes place during a change of the shifting position. This displacement of the selector shaft 106 causes a displacement movement of the selector fork 108 along an axis of the selector shaft 106. The displacement movement of the selector fork 108 is transferred to the bar element 130 by way of the ball element 112 and the connecting element 110. During this operation, the bar element 130 moves along the axis of motion 136. Consequently, the transducer element 124 accommodated in the accommodating segment 134 moves with the bar element 130. The detection device 126 is designed to detect such a position change of the transducer element 124. The change of the shifting position can be detected based on the position change of the transducer element.

Figure 2:
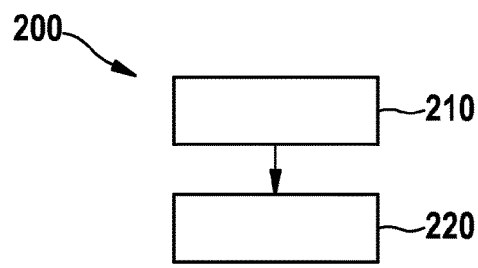
FIG. 2 is a flow chart of a method according to an exemplary embodiment of the present invention.

FIG. 2 shows a flow chart of a method 200 according to an exemplary embodiment of the present invention. The method 200 is used for detecting a shifting position of a vehicle transmission having a transmission chamber in which transmission elements are disposed. The method 200 includes a step 210 of transferring to a bar element a displacement that is dependent on a change of the shifting position of a transmission element that is positioned depending on the shifting position and that is disposed in the transmission chamber. In this case, the bar element extends from the transmission chamber into an adjoining chamber that is sealed off from the transmission chamber and is disposed so as to be displaceable depending on the shifting position. In this case, the bar element has an interface that is disposed in the transmission chamber for coupling the bar element to the transmission element that is positioned depending on the shifting position and an accommodating segment that is disposed in the adjoining chamber. The method 200 also includes a step 220 of determining a position of a transducer element that is dependent on the shifting position or a displacement of a transducer element that is dependent on a change of the shifting position by way of a detection device in order to detect the shifting position of the vehicle transmission. Here, the transducer element is mounted on the accommodating segment of the bar element. The method 200 can advantageously be implemented in combination with or using a sensor device such as the sensor device from FIG. 1. As a result of implementing the method 200, a shifting position of a vehicle transmission can advantageously be detected by use of a sensor device such as the sensor device from FIG. 1.

REFERENCE CHARACTER LIST 100 vehicle transmission
102 transmission chamber
104 transmission housing
106 selector shaft
108 selector fork
110 connecting element
112 ball element
120 sensor device
122 adjoining chamber
124 transducer element
126 detection device
130 bar element
132 interface
134 accommodating segment
136 axis of motion
140 sealing element
150 guide element
200 detecting method
210 transfer step
220 determination step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor device for detecting a shifting position of a vehicle transmission comprising a transmission chamber in which transmission elements are disposed, the transmission chamber located within a transmission housing, the sensor device comprising:
    a bar element extending from the transmission chamber into an adjoining chamber that is sealed off from the transmission chamber and disposed so as to be displaceable depending on the shifting position, wherein the bar element comprises an interface that is disposed in the transmission chamber for coupling the bar element to a transmission element that is positioned depending on the shifting position and an accommodating segment that is disposed in the adjoining chamber;
    a transducer element that is mounted on the accommodating segment of the bar element;
    a detection device disposed on an outer surface of the transmission housing for detecting a position of the transducer element that is dependent on the shifting position or a displacement of the transducer element that is dependent on a change of the shifting position; and
    at least one sealing element for fluid-tight and/or particle-tight sealing off of the adjoining chamber from the transmission chamber, wherein
    the bar element is fed through the at least one sealing element;
    the detection device comprises a sensor based on a magnetic principle and the transducer element comprises a magnet or a magnetisable material; and
    the bar element comprises a non-magnetic material.

2. The sensor device according to claim 1, further comprising at least one guide element that is disposed in the adjoining chamber at least partly around the bar element, wherein
    the at least one guide element is designed to guide the bar element in the adjoining chamber along an axis of motion of the bar element during a displacement of the bar element that is dependent on a change of the shifting position.

3. The sensor device according to claim 1, wherein the detection device is designed to detect a direction of motion of the transducer element that is mounted on the bar element along an axis of motion of the bar element that is dependent on the change of the shifting position during a displacement of the transducer element that is dependent on a change of the shifting position.

4. The sensor device according to claim 1, wherein the non-magnetic material is aluminum or plastic.

5. A vehicle transmission, comprising:
- a transmission chamber in which transmission elements are disposed, the transmission chamber located within a transmission housing;
- a selector fork that is disposed in the transmission chamber and that is designed to shift at least one transmission element;
- a selector shaft that is disposed in the transmission chamber and that is designed to displace the selector fork depending on a shifting position of the vehicle transmission; and
- a sensor device for detecting a shifting position of the vehicle transmission, the sensor device comprising:
- a bar element extending from the transmission chamber into an adjoining chamber that is sealed off from the transmission chamber and disposed so as to be displaceable depending on the shifting position, wherein the bar element comprises an interface that is disposed in the transmission chamber for coupling the bar element to a transmission element that is positioned depending on the shifting position and an accommodating segment that is disposed in the adjoining chamber;
- a transducer element that is mounted on the accommodating segment of the bar element;
- a detection device disposed on an outer surface of the transmission housing for detecting a position of the transducer element that is dependent on the shifting position or a displacement of the transducer element that is dependent on a change of the shifting position; and
- at least one sealing element for fluid-tight and/or particle-tight sealing off of the adjoining chamber from the transmission chamber, wherein the bar element is fed through the at least one sealing element;

the detection device comprises a sensor based on a magnetic principle and the transducer element comprises a magnet or a magnetisable material;

the bar element comprises a non-magnetic material; and the interface of the bar element of the sensor device is mechanically coupled to the selector fork by at least one connecting element.

6. The vehicle transmission according to claim 5, wherein the at least one connecting element is designed to transfer a displacement of the selector fork that is dependent on a change of the shifting position to the bar element of the sensor device.

7. The vehicle transmission according to claim 5, wherein the at least one connecting element comprises a connecting rod whose first end is mechanically coupled to the interface of the bar element and whose second end comprises a ball segment or is connected to a ball element, wherein the ball segment or the ball element is designed to be mechanically connected to the selector fork.

8. The vehicle transmission according to claim 6, wherein the at least one connecting element comprises a connecting rod whose first end is mechanically coupled to the interface of the bar element and whose second end comprises a ball segment or is connected to a ball element, wherein the ball segment or the ball element is designed to be mechanically connected to the selector fork.

* * * * *